UNITED STATES PATENT OFFICE.

JAMES E. DEVINE, OF BALTIMORE, MARYLAND, ASSIGNOR OF ONE-HALF TO FREDERICK H. SAMSTAG, OF SAME PLACE.

COMPOSITION FOR CLEANING WALL-PAPER AND FOR OTHER PURPOSES.

SPECIFICATION forming part of Letters Patent No. 476,788, dated June 14, 1892.

Application filed April 2, 1892. Serial No. 427,534. (No specimens.)

*To all whom it may concern:*

Be it known that I, JAMES E. DEVINE, a citizen of the United States, residing at Baltimore, State of Maryland, have invented new and useful Improvements in a Composition for Cleaning Wall-Paper and for other Purposes, of which the following is a specification.

This invention has for its object to provide a new and improved detergent of a plastic nature or putty-like consistency for cleaning wall-paper, calcimining, frescoing, and the like, and absorbing the dirt removed, so that particles will not drop from walls or ceilings upon the floor or upon articles of furniture in the apartment.

The invention also has for its object to provide a new and improved detergent of a floury and plastic nature or putty-like consistency, which is self-preserving and wherein the odor of the cooked flour is counteracted by a disinfectant ingredient, and the compound is colored dark to avoid the unsightly appearance of a white compound when used for a short time in cleaning wall-paper and other material or objects.

The invention consists, essentially, in a plastic composition for cleaning wall-paper and the like composed of partially-cooked flour, chloride of sodium, (common salt,) and pulverized naphthaline mixed together into a homogeneous mass.

In carrying my invention into effect I take rye and wheat flour and mix them together into a dough, which is then partially cooked or baked and the crust removed. To the cooked or baked rye and wheat flour I add chloride of sodium (common salt) and powdered or pulverized naphthaline, and into the mixture I introduce cornmeal and burnt umber. The proportions of the several ingredients may be largely varied, but the following formula will give good results: one pound of rye-flour, one pound of wheat-flour, one ounce of chloride of sodium, (common salt,) one-half ounce of solid naphthaline properly pulverized, one ounce of cornmeal, one-eighth of an ounce of burnt umber.

The chloride of sodium is a cleaning medium and also preserves the compound or composition. The pulverized naphthaline makes the compound or composition of an absorbent nature, aids in preserving the same, and operates as a disinfectant, while it counteracts the odor of the partially baked or cooked flour. The cornmeal and rye-flour toughen the plastic compound and make it of a putty-like consistency, the body of which is porous, so that in using the compound it absorbs the dirt removed, and thereby prevents particles from dropping from walls or ceilings upon the floor or upon articles of furniture in the apartment. The composition is formed into a mass of about the proper size to be grasped in the hand, and in cleaning wall-paper, frescoing, painted walls, calcimining, and the like the compound should be drawn in one direction over the surface to be cleaned.

Having thus described my invention, what I claim is—

1. A plastic composition for cleaning wall-paper and the like, consisting of partially-cooked flour, chloride of sodium, and powdered naphthaline, all commingled together in a homogeneous mass of a putty-like consistency, substantially as described.

2. A plastic composition for cleaning wall-paper and the like, consisting of partially-cooked rye and wheat flour mixed, cornmeal, chloride of sodium, powdered naphthaline, and a coloring-matter, all commingled together into a homogeneous mass of a putty-like consistency, substantially as described.

3. A plastic composition for cleaning wall-paper and the like, consisting of partially-cooked rye and wheat flour, chloride of sodium, pulverized naphthaline, and coloring-matter, such as burnt umber, all commingled together into a homogeneous mass of a putty-like consistency, substantially as described.

In testimony whereof I have hereunto set my hand and affixed my seal in presence of two subscribing witnesses.

JAMES E. DEVINE. [L. S.]

Witnesses:
ALBERT H. NORRIS,
JAMES A. RUTHERFORD.